United States Patent Office 2,934,515
Patented Apr. 26, 1960

2,934,515

POLYTETRAFLUOROETHYLENE-SILICONE COMPOSITIONS

George M. Konkle and Thomas D. Talcott, Midland, Mich., assignors to Dow Corning Corporation, Midland, Mich., a corporation of Michigan No Drawing. Application July 1, 1957
Serial No. 668,876

5 Claims. (Cl. 260—45.5)

This invention relates to improved polytetrafluoroethylene compositions and articles manufactured therefrom.

Solid polytetrafluoroethylene has been widely accepted in industry because of its extreme inertness. It has withstood boiling solvents, including a variety of halogenated hydrocarbons, ketones, esters and alcohols without swelling or change in weight. Therefore, it has become popular as a material for gaskets where such solvents are present. Its tear strength in such a form ranges from 400 to 800 pounds per inch. As for tensile strength it being to draw at loads of 1500 to 2000 pounds per square inch. This material also has excellent dielectric properties. It retains these properties over a temperature range from $-50°$ F. to over $500°$ F.

The main objection to solid polytetrafluoroethylene as a gasket material is its lack of resiliency. It is hard and stiff thereby requiring strong glands, flanges and bolts in order to compress a gasket sufficiently to effect a seal against the metal confining surfaces. Once a seal is effected, it is difficult to maintain it for two reasons. First, a gasket once distorted restores to its original shape only slowly whereby the gaskets leak when conditions change. This presents a major problem in batch operation or in any situation where variation in temperature changes the pressure on the gasket through expansion and contraction of the flanges and bolts. Second, a polytetrafluoroethylene gasket exhibits a high degree of "cold-flow" even for moderate loads. Therefore, the gasket and flange joint must be constantly readjusted to maintain a good seal. An improvement in resiliency would negate the effect of "cold-flow." Furthermore, a suitable composition might bind the polytetrafluoroethylene sufficiently to eliminate "cold-flow."

Up to this time these short-comings have been compensated for by mechanical means such as the use of spring-loaded bolts in gasketed joints. However, there has been no solution to these problems.

Therefore, it is the object of this invention to prepare solid polytetrafluoroethylene compositions which have improved resiliency without sacrificing the solvent resistance, thermal stability and dielectric strength of solid polytetrafluoroethylene by itself.

This invention relates to a mixture of (1) solid polytetrafluoroethylene and 20 to 80 parts by weight per 100 parts of (1) of (2) an organopolysiloxane gum consisting essentially of units of the formula

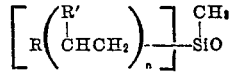

where each R is hydrogen or methyl radicals, each R′ is a monovalent perfluoroalkyl radical of from one to ten inclusive carbon atoms and each $n$ has a value of from 1 to 4 inclusive. Furthermore, siloxane (2) can also contain up to 10 mol percent of any combination of siloxanes of the formula R″$_2$SiO where R″ is phenyl, vinyl or methyl.

The term "consisting essentially of" indicates that the siloxane gum is made up primarily of diorganosiloxane units, but a limited number of triorganosiloxane units, e.g.

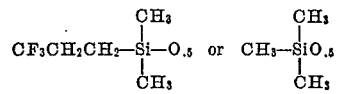

and monoorganosiloxane units, e.g. $CF_3CH_2CH_2SiO_{1.5}$ or $C_6H_5SiO_{1.5}$ can be present without putting the resulting gums outside the scope of this invention.

As shown above in siloxane (2), R can be hydrogen or the methyl radical. R′ can be any monovalent perfluoroalkyl radical of from 1 to 10 carbon atoms, such as trifluoromethyl, pentafluoroethyl, heptafluoropropyl, perfluoroheptyl or perfluorodecyl radicals. $n$ can have a value of from 1 to 4 thereby including within the scope of this invention such radical as $CF_3CH_2CH_2—$,

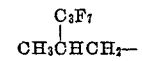

and

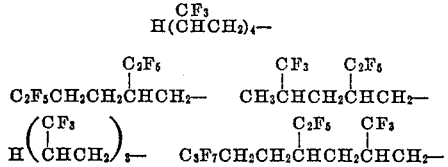

and

If less than 20 parts by weight of gum (2) per 100 parts of polytetrafluoroethylene (1) is employed, the effect of the gum is lost. If more than 80 parts by weight of gum (2) per 100 parts of polytetrafluoroethylene (1) is employed, tensile strength is markedly decreased.

The siloxane gum (2) of this invention can be either a homopolymer or copolymer and is prepared by polymerizing cyclic trisiloxanes of the formula

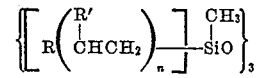

where R, $n$ and R′ are as above defined. The best method of doing this is described in the copending application of Oscar K. Johannson, Serial No. 594,107, filed June 27, 1956. In general, the polymerization of the cyclic trisiloxane is best carried out in the presence of an alkaline catalyst such as alkali metal hydroxides or the siloxane salts of alkali metal hydroxides at temperatures ranging from 50 to 150° C. The preparation of cyclic trisiloxanes from chlorosilanes is described in the copending application of Ogden R. Pierce and George W. Holbrook, Serial No. 594,108, filed June 27, 1956. These methods are operative where R is hydrogen or the methyl radical and where $n$ has any value from 1 to 4. Both of these copending applications are hereby made a part of this specification by reference.

The corresponding chlorosilanes are disclosed in the following copending applications:

Serial No. 608,667, filed September 10, 1956, by Paul Tarrant and George W. Dyckes;

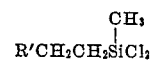

Serial No. 608,668, filed September 10, 1956, by Paul Tarrant, now abandoned; and

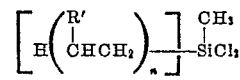

Serial No. 644,479, filed March 7, 1957, by Ogden R. Pierce, now Patent 2,894,969. These applications are incorporated into this specification by this reference.

In general, fluorinated alkenes of the formula

are reacted with

under proper conditions to form either the simple adduct or the telomeric adducts.

As stated above, siloxane (2) can also contain up to 10 mol percent of any combination of phenylmethylsiloxane units, dimethylsiloxane units, diphenylsiloxane units, phenylvinylsiloxane units, divinylsiloxane units and methylvinylsiloxane units. These are best included by mixing the corresponding cyclic trisiloxanes with the abovementioned cyclic trisiloxanes and performing an alkaline copolymerization as described above.

The compositions of this invention are best mixed by milling the gum on a standard two roll rubber compounding mill and adding dry particles of solid polytetrafluoroethylene, which is readily available on the market. The shearing action of the mill will cause the polytetrafluoroethylene particles to deform and elongate, forming fibers in the gum. Subsequent milling in a cross direction will produce a solid matting of fibers held by the gum so that tensile strength and tear strength will be good in all directions. Alternatively, the polytetrafluoroethylene can be added in a dispersion in any carrying agent, such as water, which does not adversely affect the siloxane gum.

The milled compositions can be vulcanized by any of the known methods for vulcanizing organosiloxane gums. One of the preferred methods comprises heating the compound with an organic peroxide such as benzoyl peroxide, tert-butyl perbenzoate, dicumyl peroxide, chlorobenzoyl peroxides and tert-butyl peracetate. Preferably these peroxides are employed in amount from 0.1 to 10% by weight based on the weight of the gum.

Additives such as pigments and dyes can be added. However, any additive which acts as a filler will tend to make the polytetrafluoroethylene more incompatible with the gum thereby increasing the minimum amount of gum which can be used. The common rubber fillers will generally defeat this invention by decreasing the millability of the unvulcanized compound thereby prohibiting an even mixture and by increasing the stiffness of the finished product.

The resulting composition has the solvent-resistance, thermal stability and dielectric properties of polytetrafluoroethylene while having much improved resilience. This material is therefore especially useful as gaskets. Furthermore, the compositions of this invention require lower molding pressure and temperature than is necessary with polytetrafluoroethylene itself.

The following examples are illustrative and are not intended to limit this invention which is properly set out in the claims.

*Example 1*

Three compositions were prepared by milling on a two roll rubber-compounding mill. Composition I consisted of 100 parts by weight of polytetrafluoroethylene, 80 parts by weight of a gum (A) consisting of 99.5 mol percent 3,3,3-trifluoropropylmethylsiloxane and 0.5 mol percent methylvinylsiloxane and 1.0 part by weight of bis-(2,4-dichloro)benzoyl peroxide. Composition II consisted of 100 parts by weight of polytetrafluoroethylene, 40 parts by weight of gum (A) and .4 part by weight of bis-(2,4-dichloro)benzoyl peroxide. Composition III consisted of 100 parts by weight of polytetrafluoroethylene, 33.3 parts by weight of gum (A) and .5 part of bis-(2,4-dichloro)-benzoyl peroxide. The bis-(2,4-dichloro)benzoyl peroxide was added as a 40% by weight dispersion in dimethylpolysiloxane fluid.

Each composition was filled until uniform, and samples were checked for durometer hardness, tensile strength (pounds per square inch), elongation (percent) and tear strength (pounds per inch). Subsequently, each composition was cured for 24 hours at 150° C. and samples were checked as above. The results were as follows:

| Comp. | As Milled | | | | After 24 hr. at 150° C. | | | |
|---|---|---|---|---|---|---|---|---|
|  | D | T | E | Tear | D | T | E | Tear |
| I | 70 | 680 | 60 |  | 73 | 600 | 80 | 317 |
| II | 85 | 840 | 30 | 255 | 88 | 940 | 10 | 375 |
| III | 85 | 305 | 10 |  | 92 | 940 | 10 | 402 |

The elongation of polytetrafluoroethylene is approximately zero percent. Thus, these compositions have satisfactory characteristics to make excellent gaskets. These compositions are extrudable whereas polytetrafluoroethylene is not.

*Example 2*

When

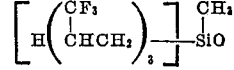

units and

units are each substituted for the

units of gum (A) in Example 1, similar excellent compositions are produced.

*Example 3*

When a copolymer consisting of 90 mol percent of

units, 6 mol percent dimethylsiloxane units, 3 mol percent methylvinylsiloxane units and 1 mol percent phenylmethylsiloxane units is substituted for gum (A) in Example 1, similar suitable gasket materials are produced.

*Example 4*

When a copolymer consisting of 50 mol percent

units, 40 mol percent

units and 10 mol percent

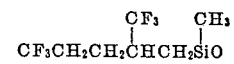

units are substituted for gum (A) in Example 1, similar compositions are produced.

That which is claimed is:

1. A composition of matter comprising a mixture of (1) solid polytetrafluoroethylene and 20 to 80 parts by weight per 100 parts of (1) of (2) an organopolysiloxane gum selected from the group consisting of polymers in which all of the recurring units are of the formula

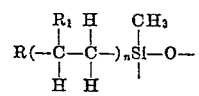

where each R is selected from the group consisting of hydrogen and methyl radicals, each R' is a monovalent perfluoroalkyl radical of from 1 to 10 inclusive carbon atoms and $n$ has a value from 1 to 4 inclusive and copolymers containing at least 90 mol percent of the aforesaid siloxane units and up to 10 mol percent siloxane units of the formula

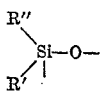

where R″ is selected from the group consisting of methyl, phenyl and vinyl radicals.

2. The composition of claim 1 in which all of the recurring units of organopoly siloxane (2) are

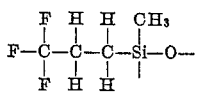

3. A composition of claim 1 in which siloxane (2) is a copolymer containing at least 90 mol percent of the recurring units

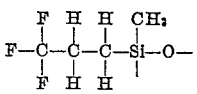

and up to 10 mol percent of the recurring units

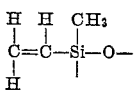

4. A composition of matter comprising a mixture of (1) solid polytetrafluoroethylene and 20 to 80 parts by weight per 100 parts of (1) of (2) an organopolysiloxane gum selected from the group consisting of polymers in which all of the recurring units are of the formula

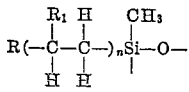

where each R is selected from the group consisting of hydrogen and methyl radicals, each R′ is a monovalent perfluoroalkyl radical of from 1 to 10 inclusive carbon atoms and $n$ has a value from 1 to 4 inclusive and copolymers containing at least 90 mol percent of the aforesaid siloxane units and up to 10 mol percent siloxane units of the formula

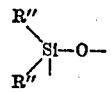

where R″ is selected from the group consisting of methyl, phenyl and vinyl radicals, and (3) an organic peroxide curing agent for (2).

5. A composition comprising a mixture of (1) solid polytetrafluoroethylene and 20 to 80 parts by weight per 100 parts of (1) of (2) a cured, solid, elastic organopolysiloxane in which all of the recurring units are

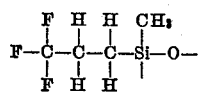

References Cited in the file of this patent

UNITED STATES PATENTS 2,710,290    Safford et al. _____ June 7, 1955
2,719,833    Vincent et al. _____ Oct. 4, 1955

OTHER REFERENCES

Crandell: Article in Rubber World, November 1955, pages 236–240.

Chem. Eng. News (1), volume 31, page 3494, Aug. 24, 1953.

Chem. Eng. News (2), volume 33, page 2079, May 16, 1955.

Tarrant: "Development of Fluoro-Silicone Elastomers," pages 3 and 38, August 1955, WADC Technical Report 55–220; published by Wright Air Development Center, Wright-Patterson Air Force Base, Ohio.

UNITED STATES PATENT OFFICE
CERTIFICATE OF CORRECTION

Patent No. 2,934,515                      April 26, 1960

George M. Konkle et al.

It is hereby certified that error appears in the printed specification of the above numbered patent requiring correction and that the said Letters Patent should read as corrected below.

Column 1, line 25, for "being" read -- begins --; column 4, lines 67 to 69, the formula should appear as shown below instead of as in the patent:

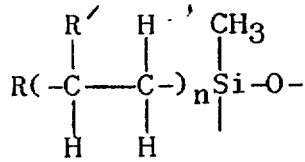

column 5, lines 3 to 6, the formula should appear as shown below instead of as in the patent:

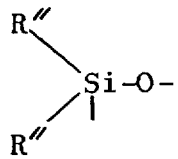

same column 5, lines 33 to 36, the formula should appear as shown below instead of as in the patent:

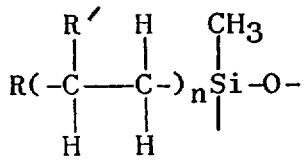

Signed and sealed this 27th day of September 1960.

(SEAL)
Attest:

KARL H. AXLINE                      ROBERT C. WATSON
Attesting Officer                Commissioner of Patents